(12) United States Patent
Khvostichenko et al.

(10) Patent No.: US 8,990,329 B1
(45) Date of Patent: Mar. 24, 2015

(54) ACCESS CONTROL LIST FOR A MULTI-USER COMMUNICATION SESSION

(71) Applicant: Google Inc., Mountain View, CA (US)

(72) Inventors: Boris Khvostichenko, Gattikon (CH); Martin Ohman, Stockholm (SE); Mayur Kamat, Bothell, WA (US)

(73) Assignee: Google Inc., Mountain View, CA (US)

( * ) Notice: Subject to any disclaimer, the term of this patent is extended or adjusted under 35 U.S.C. 154(b) by 312 days.

(21) Appl. No.: 13/668,452

(22) Filed: Nov. 5, 2012

Related U.S. Application Data

(60) Provisional application No. 61/682,276, filed on Aug. 12, 2012.

(51) Int. Cl.
*G06F 15/16* (2006.01)

(52) U.S. Cl.
USPC ............................................. 709/206

(58) Field of Classification Search
None
See application file for complete search history.

(56) References Cited

U.S. PATENT DOCUMENTS

| | | | |
|---|---|---|---|
| 8,010,656 B2 * | 8/2011 | Baron et al. | 709/224 |
| 2006/0031349 A1 * | 2/2006 | Bailey et al. | 709/206 |

\* cited by examiner

*Primary Examiner* — Brian P Whipple
(74) *Attorney, Agent, or Firm* — Patent Law Works LLP

(57) ABSTRACT

A system and associated methods for adding one or more invitees from a calendar event to an access control list of a multi-user communication session is disclosed. The conference application includes a social network engine, a conference server module, a session management module and a user interface engine. The social network engine hosts a multi-user communication session associated with a calendar event at the social network server. The conference server module retrieves an invitee list from a calendar application, converts the invitee list into an access control list for the multi-user communication session and stores the access control list in a cache. The session management module receives a request from one or more users to join the multi-user communication session, retrieves the access control list for the multi-user communication session from the cache and compares the one or more users against the access control list.

19 Claims, 7 Drawing Sheets

ACCESS CONTROL LIST FOR A MULTI-USER COMMUNICATION SESSION

CROSS REFERENCE TO RELATED APPLICATIONS

This application claims priority under 35 USC §119(e) to U.S. Application No. 61/682,276, entitled "Access Control List for a Multi-User Communication Session" filed Aug. 12, 2012, the entirety of which is herein incorporated by reference.

BACKGROUND

Conferencing software frequently does not support email and scheduling functions. As a result, various approaches have been developed to integrate conferencing software with email and scheduling applications. The most common approach is to generate a calendar invite that links to the conference and includes a personal identification number (PIN) for accessing the conference. This presents multiple problems. First, the email can be forwarded to other people who were not invited to the conference. Second, the PIN is one more cumbersome step that discourages users from adopting the technology. Third, if invitees want to invite additional participants to the conference, the interplay between the conferencing software and the email and scheduling application can be cumbersome.

SUMMARY

In some embodiments, the specification describes a computer-implemented method comprising: receiving a first request from a first user to join a multi-user communication session that is associated with a social network, the first user being a member of the social network, responsive to receiving the first request, retrieving an invitee list from an event in a calendar application, converting the invitee list into an access control list and storing the access control list in a cache, determining whether the first user is on the access control list, responsive to the first user being on the access control list, starting the multi-user communication session, receiving a second request from a second user to join the multi-user communication session, identifying the second user as being on the access control list, adding the second user to the multi-user communication session, ending the multi-user communication session, and discarding the access control list.

In some embodiments, the operations further include extracting identifiers of the users from the access control list, comparing a user profile of the first user to the identifiers to identify a match, and responsive to determining the match, confirming that the first user is on the access control list. The operations further include responsive to receiving a request from the calendaring application, transmitting identifying information associated with a group in the social network, wherein the multi-user communication session is associated with the group in the social network. The operations further include receiving a request from the first user to add a third user to the multi-communication session, adding the third user to the access control list, and adding the third user to the multi-user communication session. The operations further include saving the access control list to a cache and discarding the access control list from the cache at an end of the multi-user communication session.

In some embodiments, the features further include the access control list being created anew responsive to the event recurring in the calendar application. The features further include the invitee list comprising at least one of a name, an email identifier and a social network profile identifier of one or more invitees. The features further include, responsive to the first user not being in the access control list, further comprising denying the first user access to the multi-user communication session.

The specification describes a conference application that advantageously works with a calendar application stored on a separate server to conduct a multi-user communication session without the use of PINs. The conference application also smoothly adds new users to multi-user communication session seamlessly instead of risking complications by involving a calendar application. Lastly, because the conference application generates an access control list for each event, the conference application avoids problems with recurring events that have a changing list of invitees.

BRIEF DESCRIPTION OF THE DRAWINGS

The specification is illustrated by way of example, and not by way of limitation in the figures of the accompanying drawings in which like reference numerals are used to refer to similar elements.

DETAILED DESCRIPTION

In one embodiment, the system includes a social network engine, a session management module, a conference server module and a user interface engine. The social network engine generates a social network and manages user interactions within the social network. The session management module generates a multi-user communication session for the social network and instructs the user interface engine to generate graphical data for displaying the multi-user communication session. In one embodiment, the session management module generates a multi-user communication session responsive to receiving a request from a user to initiate the multi-user communication session. The session management module generates a multi-user communication session by interacting with audio and video capture user devices to obtain a real-time audio-video synchronous communication data stream of the user. For example, the session management module interfaces with a software driver stored on the user device that controls the functionality of a microphone and a video camera (e.g., a webcam or forward facing camera) included in the user device. In another embodiment, the session management module receives a request from a first user to join the multi-user communication session. The request includes at least one of a name, an email identifier and a social network profile identifier associated with the first user. In another embodiment, the session management module permits other users into the multi-user communication session based on the access control list associated with the multi-user communication session.

The conference server module retrieves an invitee list from a calendar application. For example, the conference server module interfaces with an online calendar application that manages day to day activities of a user. In one embodiment, the conference server module determines whether the multi-user communication session has started before retrieving the invitee list. The conference server module determines the access control list for the multi-user communication session responsive to retrieving the invitee list and stores the access control list in a cache. In one embodiment, the conference server module updates the access control list for the multi-user communication session using the invitee list. The invitee list comprises at least one of a name, an email identifier and a social network profile identifier of one or more invitees. In one embodiment, the conference server module converts the invitee list into the access control list by matching the identifying information (e.g. an email address) to user profile information for the social network.

Figure 1:
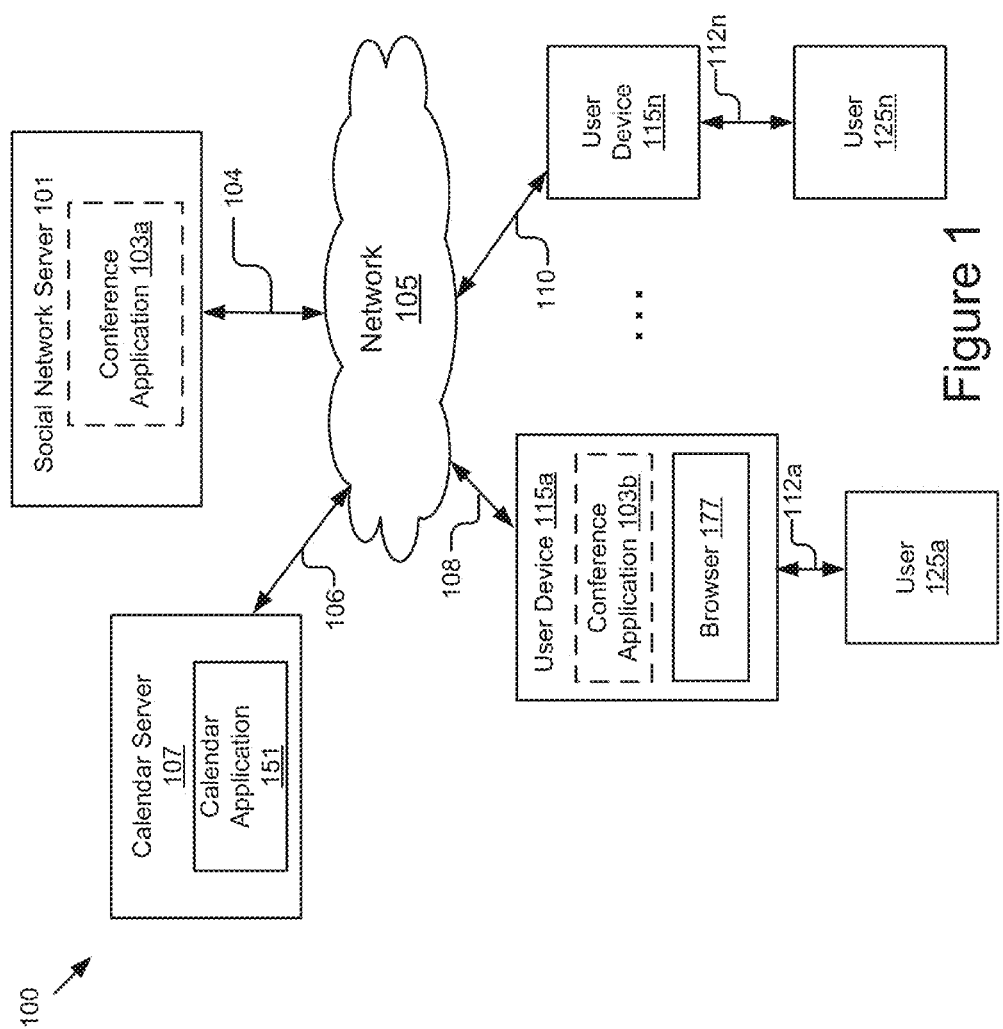
FIG. 1 is a block diagram illustrating an example of a system for adding one or more invitees from an event in a calendar application to an access control list of a multi-user communication session.

FIG. 1 illustrates a block diagram of a system 100 for adding one or more invitees from a scheduled event in a calendar application to an access control list of a multi-user communication session. The illustrated description of the system 100 includes user devices 115a . . . 115n that are accessed by users 125a . . . 125n, a social network server 101 and a calendar server 107. In the illustrated embodiment, these entities of the system 100 are communicatively coupled via a network 105. In FIG. 1 and the remaining figures, a letter after a reference number, for example "115a" is a reference to the element having that particular reference number. A reference number in the text without a following letter, for example "115," is a general reference to any or all instances of the element bearing that reference number.

The network 105 may be a conventional type network, wired or wireless, and may have any number of configurations for example a star configuration, token ring configuration or other configurations known to those skilled in the art. Furthermore, the network 105 may comprise a local area network (LAN), a wide area network (WAN) (e.g., the Internet), and/or any other interconnected data path across which multiple devices may communicate. In one embodiment, the network 105 may be a peer-to-peer network. The network 105 may also be coupled to or includes portions of a telecommunications network for sending data in a variety of different communication protocols. In another embodiment, the network 105 includes Bluetooth communication networks or a cellular communications network for sending and receiving data for example via SMS/MMS, hypertext transfer protocol (HTTP), direct data connection, WAP, e-mail, etc. While only one network 105 is illustrated, persons with ordinary skill in the art will recognize that any number of networks may be coupled to the above mentioned entities.

In one embodiment, a conference application 103a may be operable on the social network server 101, which is coupled to the network 105 via signal line 104. The social network server 101 can be a hardware server that includes a processor, a memory and network communication capabilities. The social network server 101 sends and receives data to and from one or more of the user devices 115a, 115n and the calendar server 107 via the network 105. The social network server 101 also includes a social network application (not pictured) that can be part of the conference application 103 or a standalone application. A social network can be any type of social structure where the users are connected by a common feature. The common feature includes relationships/connections, e.g., friendship, family, work, an interest, etc. The common features are provided by one or more social networking systems, such as those included in the architecture 100, including explicitly defined relationships and relationships implied by social connections with other online users, where the relationships form a social graph. In some examples, the social graph can reflect a mapping of these users and how they are related. Furthermore, it should be understood that the social network server 101 may be representative of one social network and that there may be multiple social networks coupled to the network 105, each having its own server, application and social graph. For example, a first social network may be more directed to business networking, a second may be more directed to or centered on academics, a third may be more directed to local business, a fourth is directed to dating and others are of general interest or a specific focus.

The user devices 115a, 115n in FIG. 1 are used by way of example. Although only two user devices 115 are illustrated, persons of ordinary skill in the art will recognize that any numbers of user devices 115 are available to any number of users 125. The users 125a, 125n interact with the client devices 115a, 115n via signal lines 112a, 112n respectively. In one embodiment, the conference application 103b may be stored on the user device 115a which is connected to the network 105 via signal line 108. In another embodiment, the conference application 103b can be a thin-client application that includes part of the conference application 103 on the user device 115a and part of the conference application 103 on the social network server 101 to add one or more invitees from a calendar event to an access control list of a multi-user communication session. The user devices 115 can be any computing device that includes a memory and a processor. For example, the user devices 115 can be a laptop computer, a desktop computer, a tablet computer, a mobile telephone, a personal digital assistant, a mobile email device, a portable game player, a portable music player, a television with one or more processors embedded therein or coupled thereto or any other electronic device capable of accessing the network 105, etc.

In one embodiment, the user device 115a includes a browser 177. The browser 177 can be code and routines stored in the memory and executed by the processor of the user device 115. The browser 177 includes any browser application that can retrieve pages hosted by a server (for example, the calendar server 107, the social network server 101, a third-party server (not shown), etc.) and can present the pages on a display device (not shown) on the user device 115a. In another embodiment, the browser 177 retrieves and presents pages hosted by the user device 115. The term page used herein encompasses its plain and ordinary meaning including, but not limited to, any document or information resource that comprises textual elements, non-textual elements (for example, static images, animated images, audio, video, etc.), interactive elements (for example, games, buttons, hyperlinks, etc.), scripts (for example, JavaScript, code implementing Ajax techniques, etc.), metadata, etc. In another embodiment, the page is a web page in any file format (for example, HTML, HTML5, XHTML, XML, etc.) known to a person with ordinary skill in the art.

In one embodiment, the calendar server 107 can be any computing device such as a hardware server including a processor, a memory and network communication capabilities. The calendar server 107 sends and receives data to and from the one or more of the user devices 115a, 115n and the social network server 101 via the network 105. The calendar server 107 also includes a calendar application 151.

The calendar application 151 can be code and routines stored in the memory and executed by the processor of the calendar server 107 for providing users with an electronic version of a calendar. The calendar application 151 maintains calendar data for users of the calendar server 107 on a calendar data storage (not pictured). In one embodiment, the calendar application 151 processes user requests to view, add and drop events on one or more dates on the electronic version of the calendar. For example, an event for celebrating birthday of a friend at 7 PM on Sunday, an event for a business meeting with colleagues from 12 PM to 1 PM, etc. The event can be public or private.

The private event includes one or more second users as invitees invited by a first user creating the event on his or her calendar. The first user can invite the one or more second users by using at least one of a name (e.g. full name, nickname, etc.), an email identifier and a social network profile identifier (e.g. a handle on the social network) of the one or more second users. The one or more second users can accept or decline the invitation to the private event that is then reflected on the personal calendar of the one or more second users. In one embodiment, the one or more second users can invite one or more third users to the event created by the first user. In another embodiment, the calendar application 151 also includes an option for calendar sharing where the first user can share his or her calendar with the one or more second users by specifying the one or more second users with whom the calendar can be shared. A level of permission can be assigned for each of the one or more second users gaining access to the shared calendar. For example, users can be assigned read-only permission or full-edit control over the shared calendar. In some embodiments, private events are visible on the calendar to event invitees and invisible to users that are not invited to the event.

In one embodiment, the calendar application 151 transmits a request to the conference application 103 to generate an event for users associated with a group in the social network generated by the conference application 103. For example, if a user wants to have a videoconference with a family group to make an announcement to family members, the user can specify in the calendar application 151 to invite members of the family group. In some embodiments, the calendar application 151 queries the conference application 103 for identifying information for the members of the family group, for example, through the use of an application programming interface (API).

In another embodiment, once a user creates an event using the calendar application 151, the calendar application 151 transmits the event details to the conference application 103. Once the event is about to begin or responsive to a user trying to join the multi-user communication session, the conference application 103 transmits a request to the calendar application 151 for the invitee list. This advantageously avoids a situation where the calendar application 151 has to transmit updates to the conference application 103 each time a change is made to the invitee list.

The conference application 103 can be code and routines for managing a multi-user communication session. The conference application 103 receives a request from one or more users to join the multi-user communication session associated with a calendar event. The conference application 103 retrieves an invitee list associated with the calendar event and converts the invitee list into an access control list for the multi-user communication session. The one or more users are checked against the access control list and provided with access permission to the multi-user communication session responsive to being present in the access control list. The conference application 103 discards the access control list for the multi-user communication session once the multi-user communication session has ended. The conference application 103 is described in further detail below with reference to FIG. 2.

Figure 2:
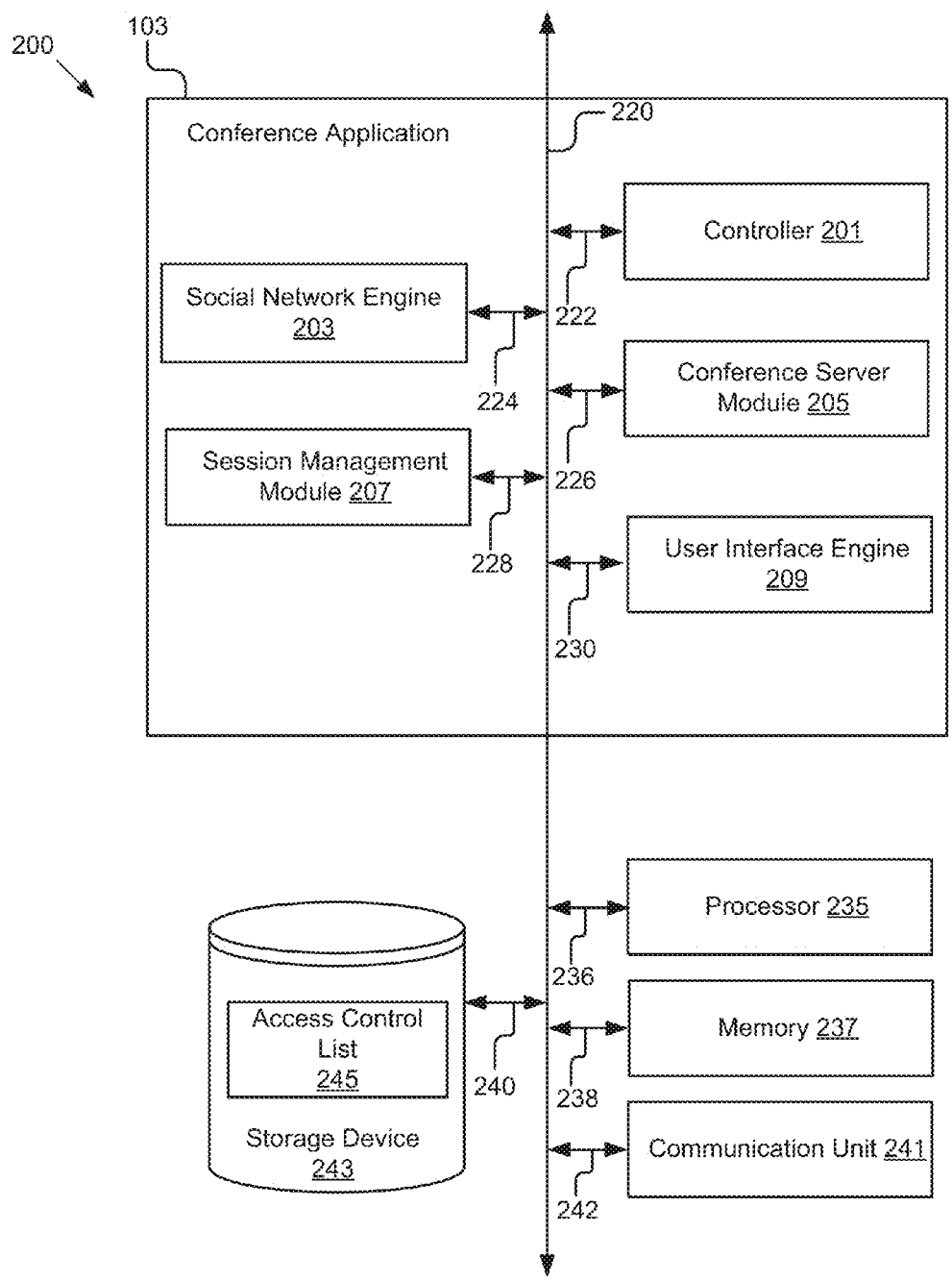
FIG. 2 is a block diagram illustrating an example of a conference application.

Referring now to FIG. 2, the conference application 103 is shown in more detail. FIG. 2 is a block diagram of a computing device 200 that includes a processor 235, a memory 237, a communication unit 241 and a storage device 243 according to some examples. The components of the computing device 200 are communicatively coupled by a bus 220. Optionally, the computing device 200 can be a social network server 101. In one embodiment, the computing device 200 may be a user device 115a.

The processor 235 includes an arithmetic logic unit, a microprocessor, a general-purpose controller or some other processor array to perform computations and provide electronic display signals to a display device. The processor 235 is coupled to the bus 220 via signal line 236 for communication with the other components. Processor 235 may process data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible.

The memory 237 stores instructions and/or data that may be executed by processor 235. The memory 237 is coupled to the bus 220 via signal line 238 for communication with the other components. The instructions and/or data may include code for performing any and/or all of the techniques described herein. The memory 237 may be a dynamic random access memory (DRAM) device, a static random access memory (SRAM) device, flash memory or some other memory device known in the art. In one embodiment, the memory 237 also includes a non-volatile memory or similar permanent storage device and media for example a hard disk drive, a floppy disk drive, a CD-ROM device, a DVD-ROM device, a DVD-RAM device, a DVD-RW device, a flash memory device, or some other mass storage device known in the art for storing information on a more permanent basis.

The communication unit 241 transmits and receives data to and from at least one of the user device 115, the calendar server 107 and the social network server 101 depending upon where the conference application 103 is stored. The communication unit 241 is coupled to the bus 220 via signal line 242. In one embodiment, the communication unit 241 includes a port for direct physical connection to the network 105 or to another communication channel. For example, the communication unit 241 includes a USB, SD, CAT-5 or similar port for wired communication with the user device 115. In another embodiment, the communication unit 241 includes a wireless transceiver for exchanging data with the user device 115 or any other communication channel using one or more wireless communication methods, such as IEEE 802.11, IEEE 802.16, BLUETOOTH® or another suitable wireless communication method.

In yet another embodiment, the communication unit 241 includes a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In yet another embodiment, the communication unit 241 includes a wired port and a wireless transceiver. The communication unit 241 also provides other conventional connections to the network for distribution of files and/or media objects using standard network protocols such as TCP/IP, HTTP, HTTPS and SMTP as will be understood to those skilled in the art.

The storage device 243 can be a non-transitory memory that temporarily stores data used by the conference application 103, for example, a cache. The storage device 243 may be a dynamic random access memory (DRAM) device, a static random access memory (SRAM) device, flash memory or some other memory device known in the art. In one embodiment, the storage device 243 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis. In the illustrated embodiment, the storage device 243 is communicatively coupled by the bus 220 for communication with the other components of the computing device 200 via signal line 240. Although only one storage device is shown in FIG. 2, multiple storage devices may be included. In another embodiment, the storage device 243 may not be included in the computing device 200 and can be communicatively coupled to the computing device 200 via the network 105.

In the illustrated embodiment, the storage device 243 stores access control list 245. The access control list 245 can be data determined by the conference server module 205 for specifying the lists of users with permission to join the multi-user communication session. In one embodiment, each entry in the access control list 245 can specify a user and an associated permission. The user can be specified by at least one of a name, an email identifier and a social network profile identifier. For example, an entry (Alice, grant) in the access control list 245 can indicate that user Alice has permission to join the multi-user communication session. In a second example, an entry (1234567, grant) in the access control list 245 can indicate the user with a social network profile identifier "1234567" has permission to join the multi-user communication session on the social network. In yet another embodiment, the access control list 245 can be used by the session management module 207 for determining access permission for one or more users to join the multi-user communication session.

In one embodiment, the conference application 103 includes a controller 201, a social network engine 203, a conference server module 205, a session management module 207 and a user interface engine 209.

The controller 201 can be code and routines for handling communications between the conference application 103 and other components of the computing device 200. In one embodiment, the controller 201 can be a set of instructions executable by the processor 235 to provide the functionality described below for handling communications between the conference application 103 and other components of the computing device 200. In another embodiment, the controller 201 can be stored in the memory 237 of the computing device 200 and can be accessible and executable by the processor 235. In either embodiment, the controller 201 may be adapted for cooperation and communication with the processor 235 and other components of the computing device 200 via signal line 222.

The controller 201 may send and receive information via the communication unit 241, to and from one or more of a user device 115, a social network server 101 and a calendar server 107. In one embodiment, the controller 201 identifies the type of data being received and transmits the data to the appropriate module or engine of the conference application 103. For example, the controller 201 receives information from the social network server 101 for rendering a user interface of the social network and transmits the information to the user interface engine 209. In another embodiment, the controller 201 receives user inputs and user actions submitted by the user 125 from the user device 115. The controller 201 sends the user actions and the user inputs to the appropriate module or engine of the conference application 103. For example, the controller 201 receives a request to join a multi-user communication session and forwards the request to the session management module 207.

In one embodiment, the controller 201 receives information from other components of the conference application 103 and transmits the information to the appropriate component in the system 100 via the communication unit 241. For example, the controller 201 receives graphical data for generating a user interface from the user interface engine 209. The controller 201 transmits the graphical data to a display device (not shown) that is part of the user device 115. In another embodiment, the controller 201 receives a conference initiation notification from the session management module 207.

In another embodiment, the controller 201 receives data from components of the conference application 103 and stores the data in the storage device 243. For example, the controller 201 receives data including the access control list determined by the conference server module 205 and stores the data in the storage device 243. In yet another embodiment, the controller 201 retrieves data from the storage device 243 and sends the data to components of the conference application 103. For example, the controller 201 retrieves data including the access control list from the storage device 243 and sends the data to the session management module 207.

The social network engine 203 can be code and routines for generating and managing a social network. In one embodiment, the social network engine 203 can a set of instructions executable by the processor 235 to provide the functionality described below for generating and managing a social network. In another embodiment, the social network engine 203 can be stored in the memory 237 of the computing device 200 and can be accessible and executable by the processor 235. In either embodiment, the social network engine 203 can be adapted for cooperation and communication with the processor 235, the controller 201, the user interface engine 209 and other components of the conference application 103.

The social network engine 203 manages the social network by handling registration of users, publication of content (e.g. posts, comments, photos, links, check-ins, etc.), hosting multi-user communication sessions, managing of groups, managing different sharing levels, updating the social graph, etc. The social network engine 203 registers a user by receiving information such as a username and password and generates a user profile that is associated with the user and stored as part of the social graph. In one embodiment, the social network engine 203 requests that the user provide the email address that the user has associated with the calendar application 151 so that the user can be properly identified in the social network as being associated with invitee lists generated by the calendar application 151. In another embodiment, the user profile includes additional information about the user including interests (e.g. soccer, reading, food), activities (e.g. searching history, indications of approval, posts, comments) and demographics (e.g. age, ethnicity, location).

The social network engine 203 receives social network content from the controller 201. The social network content includes, for example, a description of activities performed by the user 125 and the user's friends, conversations, events, etc. The social network engine 203 transmits instructions to the user interface engine 209 to generate graphical data for displaying a user interface that includes the social network content.

In one embodiment, the social network engine 203 communicates with the calendar server 107 to access the calendar data of one or more users. The social network engine 203 generates a notification to alert the one or more users on the social network of the oncoming multi-user communication session corresponding to a shared calendar event. For example, a selectable visual reminder or a textual reminder is generated on a social network profile of the users associated with shared calendar event.

In another embodiment, the social network engine 203 receives instructions from the session management module 207 for hosting the multi-user communication session at the social network server 101. For example, the social network engine 203 receives a unique Uniform Resource Locator (URL) associated with the multi-user communication session that is generated by the session management module 207 and incorporates the URL at the social network server 101. The social network engine 203 retrieves profile information including a profile photo and a name for providing presence awareness of the one or more users participating in the multi-user communication session. The profile information is retrieved responsive to receiving at least one of an email identifier, a name and a social network profile identifier of the one or more users associated with the multi-user communication session.

The conference server module 205 can be code and routines for determining an access control list for the multi-user communication session. In one embodiment, the conference server module 205 can be a set of instructions executable by the processor 235 to provide the functionality described below for generating and managing a social network. In another embodiment, the conference server module 205 can be stored in the memory 237 of the computing device 200 and can be accessible and executable by the processor 235. In either embodiment, the conference server module 205 can be adapted for cooperation and communication with the processor 235, the controller 201, the social network engine 203, the session management module 207 and other components of the conference application 103.

In one embodiment, the conference server module 205 communicates with the calendar server 107 to retrieve a calendar invitee list for one or more events created by the calendar application 151. For example, the conference server module 205 interfaces with an integrated calendar application in the social network that manages day to day activities of a user. The conference server module 205 converts the calendar invitee list into the access control list for the multi-user communication session associated with the one or more events. The calendar invitee list comprises at least one of a name, an email identifier and a social network profile identifier of the one or more invitees. In one embodiment, the conference server module 205 extracts the identifying information (e.g. an email address) from the calendar invitee list and matches the identifying information to user profile information for the social network. For example, a user Alice can have an email address alice@xyz.com associated with her profile information on the social network. If a match is found in the social network, the conference server module 205 generates a corresponding entry in the access control list for the multi-user communication session. The conference server module 205 stores the access control list in the storage device 243.

In one embodiment, the conference server module 205 determines the access control list anew for recurring events in the calendar application 151 which may include different invitees. For example, an access control list for a weekly business meeting event is determined every week. The conference server module 205 discards the access control list once the multi-user communication session associated with the event has ended. Because the conference server module 205 generates an access control list for each event, the conference application 103 avoids problems with recurring events that have a changing list of invitees.

In one embodiment, the conference server module 205 receives information from the session management module 207 instructing that the multi-user communication session has ended. The conference server module 205 discards the access control list in the storage device 243 responsive to receiving the information from the session management module 207.

In another embodiment, the calendar application 151 requests information from the conference server module 205 to generate the invitee list. The conference server module 205 receives a request from the calendar application 151 via the controller 201 for information about a group on the social network. For example, a user wants to setup a skiing event with his ski group on the social network. The social network engine 203 provides the calendar application 151 with contact information for the members of the group (e.g. names, email addresses, unique identifiers, etc.).

The session management module 207 can be code and routines for generating a multi-user communication session and instructing the user interface engine 209 to generate graphical data for displaying the multi-user communication session. In one embodiment, the session management module 207 can be a set of instructions executable by the processor 235 to provide the functionality described below for generating a multi-user communication session. In another embodiment, the session management module 207 can be stored in the memory 237 of the computing device 200 and can be accessible and executable by the processor 235. In either embodiment, the session management module 207 can be adapted for cooperation and communication with the processor 235, the conference server module 205, the social network engine 203 and other components of the conference application 103.

In one embodiment, the session management module 207 generates a multi-user communication session responsive to receiving a user request for starting the multi-user communication session at the social network. The multi-user communication session comprises at least one of a video conference, an audio conference and instant messaging. In one embodiment, the session management module 207 generates a multi-user communication session by interacting with audio and video capture devices of the user device 115 to obtain a real-time audio-video synchronous communication data stream of the user 125. For example, the session management module 207 interfaces with a software driver stored on the user device 115 that controls the functionality of a microphone and a video camera (e.g., a webcam or forward facing camera) included in the user device 115. The audio-video data stream captured by a user device 115 may be encoded using various audio and video codecs and then encapsulated into a container before transmitting to the user interface engine 209. In another embodiment, the session management module 207 generates a multi-user communication session that allows users participating in the session to share documents, a scratchpad and computing device screenshots with one another.

The session management module 207 receives a request from one or more users to join the multi-user communication session at the social network. In one embodiment, the multi-user communication session corresponds to a shared calendar event. The session management module 207 receives the access control list associated with the multi-user communication session from the conference server module 205 or retrieves the access control list from the storage device 243 and determines whether the one or more users are present on the access control list. The session management module 207 compares the user profile information of the one or more users against the retrieved access control list and confirms that the one or more users are present on the access control list responsive to determining a match. The session management module 207 then provides access permission for the one or more users found present in the access control list to join and starts the multi-user communication session. For example, a user Alice with a social network profile identifier "1234567" requests to join the multi-user communication session at the social network. If a corresponding matching entry (1234567, grant) is found in the access control list, then the user Alice is granted permission by the session management module 207 to join the multi-user communication session. In one embodiment, the session management module 207 generates a unique Uniform Resource Locator (URL) associated with the multi-user communication session to send to the social network engine 203 to host the multi-user communication session at the social network server 101.

The session management module 207 receives a request from a permitted user in the multi-user communication session to add one or more users that are absent on the invitee list into the multi-user communication session. In one embodiment, the request includes the Uniform Resource Locator (URL) associated with the multi-user communication session. For example, the user Alice, who is a member of the multi-user communication session, can request to add another user, for example, by clicking an add button being displayed in the user interface. The session management module 207 updates the access control list to include the one or more users added to the multi-user communication session. The session management module 207 then provides access permission for the one or more users found present in the updated access control list to join the multi-user communication session. In one embodiment, the session management module 207 sends a URL for joining the multi-user communication session to the user. In another embodiment, the session management module 207 sends another type of notification to the user to invite the user to join the session, for example, a notification in the social network or a message with an invitation.

The user interface engine 209 can be code and routines including routines for generating graphical data for providing user interfaces to users. In one embodiment, the user interface engine 209 can be a set of instructions executable by the processor 235 to provide the functionality described below for generating graphical data for providing user interfaces that includes information from the social network, the calendar and the multi-user communication session. In another embodiment, the user interface engine 209 can be stored in the memory 237 of the computing device 200 and is accessible and executable by the processor 235. In either embodiment, the user interface engine 209 can be adapted for cooperation and communication with the processor 235 and other components of the conference application 103.

In one embodiment, the user interface engine 209 receives instructions from the calendar server 107 to generate graphical data that depicts an electronic calendar or a user interface for establishing an event. An example of a user interface for establishing an event is illustrated below as FIG. 3A. In another embodiment, the user interface engine 209 generates graphical data for social network content based at least in part on instructions from the social network engine 203. For example, the user interface engine 209 generates graphical data for displaying posts, comments, photos, videos, etc. The user interface engine 209 sends the graphical data to an application (e.g., a browser) in the user device 115 via the communication unit 241 causing the application to display the data in a user interface.

In one embodiment, the user interface engine 209 receives instructions from the session management module 207 to generate graphical data for displaying a multi-user communication session. In another embodiment, the user interface engine 209 receives a user action corresponding to the multi-user communication session. The term user action used herein encompasses its plain and ordinary meaning including, but not limited, to any action performed by the user 125 using the user interface provided to the user 125. The user action includes muting the volume on the video conference, enlarging the video conference to full-screen, switching to another video conference in the browser window, hiding the display of the video conference, etc. The user interface engine 209 updates the graphical data in response to the received user actions. Examples of user interfaces including graphical data that displays video conferences are explained in further detail with reference to FIGS. 3B-3C.

Figure 3A:
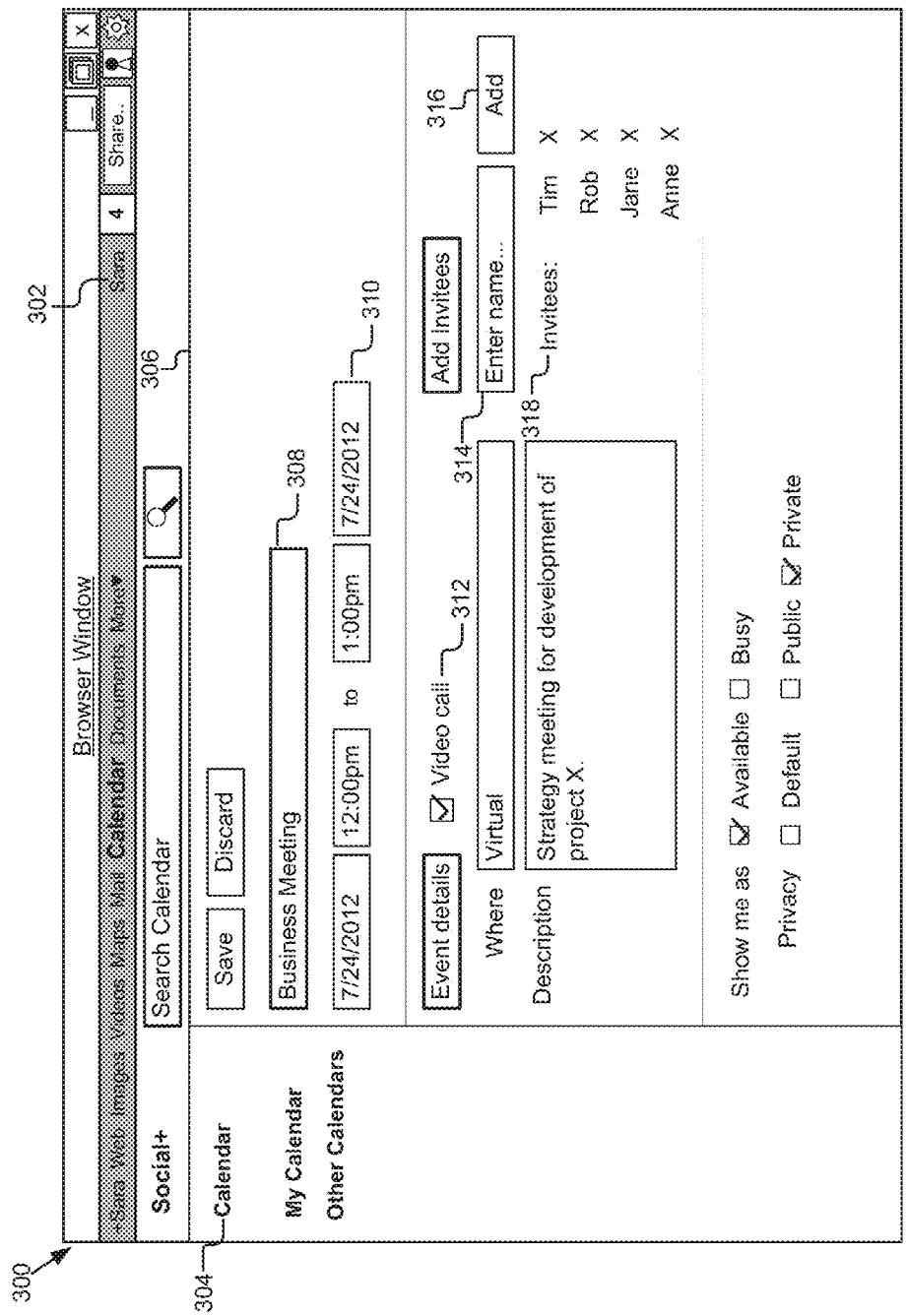
FIG. 3A is an example graphic representation of a user interface for adding one or more invitees to an event in a calendar application.

Turning now to FIG. 3A, one example of a graphical representation of a user interface 300 for adding one or more invitees to an event in an electronic calendar is illustrated. The user interface 300 displays an events page 306 under the calendar link 304 in a social network associated with the user Sara 302. Persons of ordinary skill in the art will recognize that other implementations are possible where the calendar application 151 is not integrated with the social network. The user Sara 302 enters the title of the event by typing the title into the title field 308. The user Sara 302 also inputs the date and time for the event under the date and time fields 310. The user Sara 302 indicates whether the event is a video call by checking the video call radio button 312 under event details. The user Sara 302 then invites one or more users to the event by entering a name in the name field 314 and clicking the add button 316. In another example, the user Sara 302 can enter an email identifier associated with the one or more users for the purpose of inviting to the event. Once the user Sara 302 is done inviting, the user interface 300 displays the list 318 of invitees added by the user Sara 302 for easy reference. When a user requests to join the conference, the conference application 103 sends a request to the calendar application 151 for the invitee list.

Figure 3B:
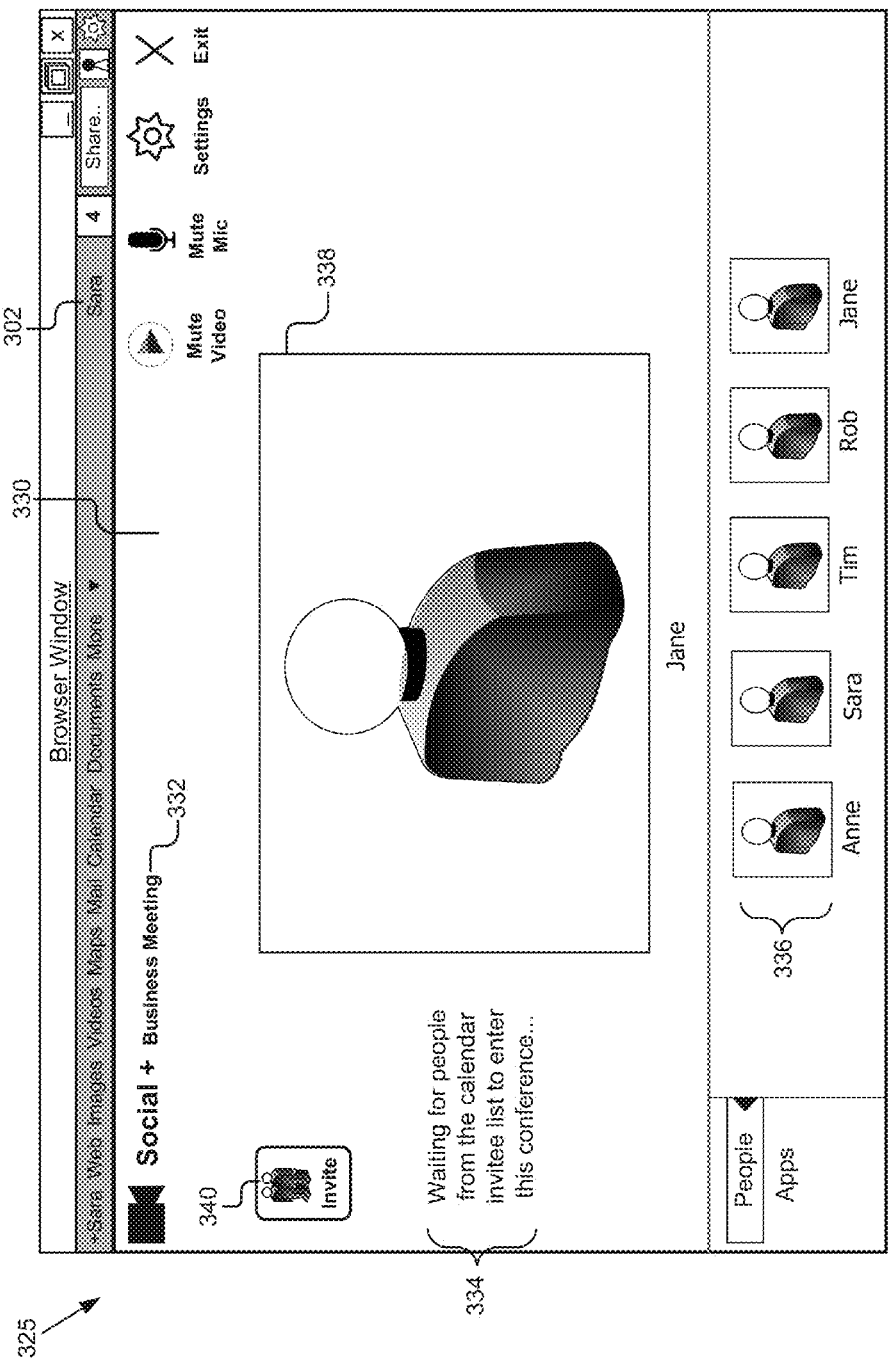
FIG. 3B is an example graphic representation of a user interface where a multi-user communication session for the one or more invitees is started based on the access control list of the multi-user communication session.

FIG. 3B illustrates an example graphical representation of a user interface 325 for displaying a multi-user communication session based on the event from the electronic calendar. The user interface 325 displays a multi-user communication session window 330 with a title 332 of the multi-user communication session extracted from the calendar event. The window 330 displays a message 334 indicating that the multi-user communication session is populated with users from the invitee list of the calendar event. The window 330 displays a list 336 of users currently permitted into the multi-user communication session based on the access control list. The list 336 includes a name and a miniaturized video stream of the users. The enlarged video stream 338 is a video stream corresponding to a user currently talking in the multi-user communication session. In addition, the user Sara 302 can invite users who are absent on the invitee list of the calendar event and thus absent on the access control list of the multi-user communication session by clicking on the invite button 340 in the window 330.

Figure 3C:
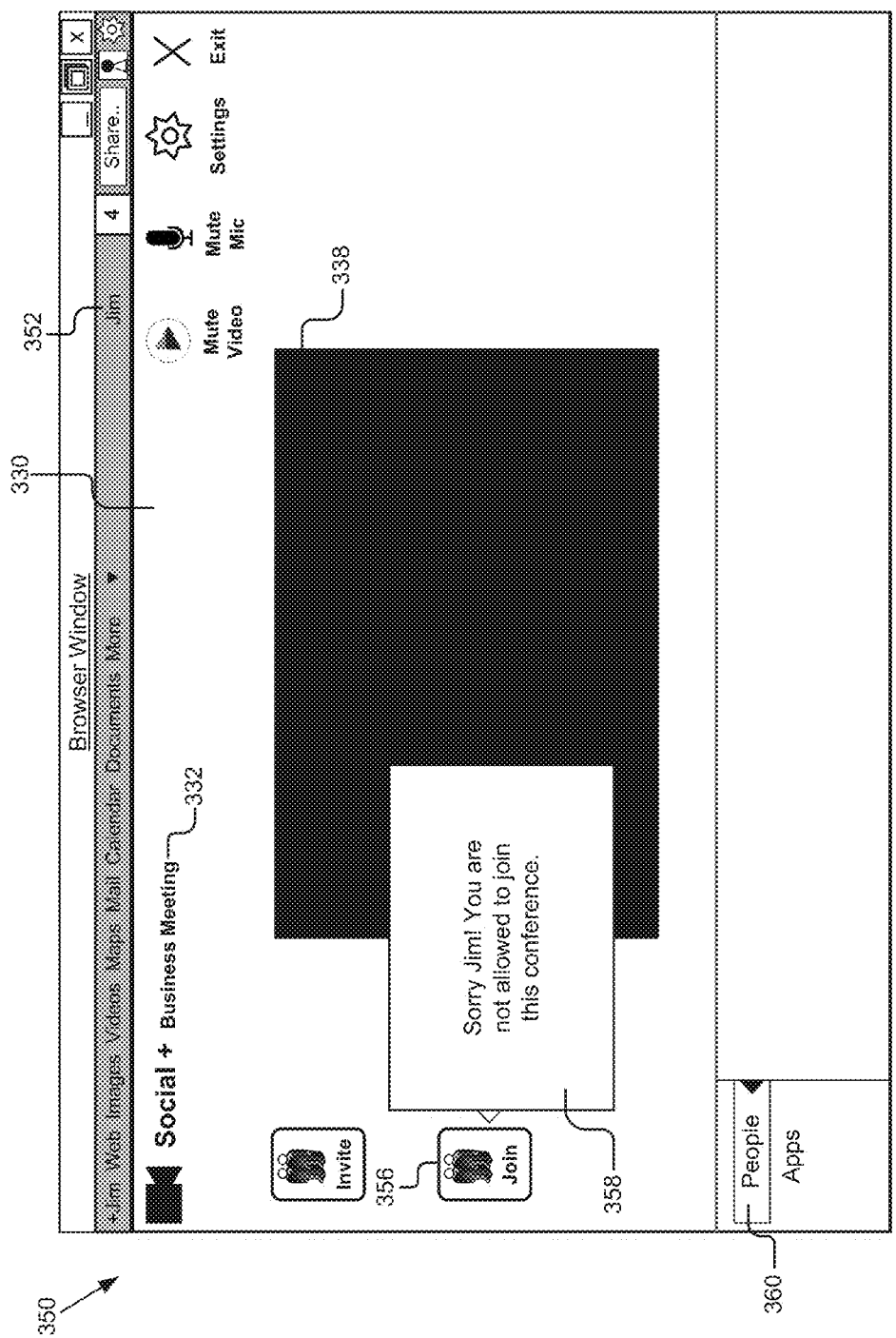
FIG. 3C is an example graphic representation of a user interface where a non-invitee is denied access to the multi-user communication session based on access control list of the multi-user communication session.

FIG. 3C illustrates an example of a graphical representation of a user interface 350 for displaying a multi-user communication session to a user absent on the access control list. The user Jim 352 requests to join the multi-user communication session 332 by clicking on the join button 356. For example, if an invitee forwarded a URL for the multi-user communication session but did not formally add Jim to the invitee list or the access control list, Jim cannot join. Since the user Jim 352 is not present on the access control list, the multi-user communication session window 330 displays a message 358 indicating that the user Jim 352 is not authorized to join the multi-user communication session 332. In addition, the multi-user communication session 332 blacks out the enlarged video feed 338 to denote that the user Jim 352 is not in the multi-user communication session. The people tab 360 is empty to denote that the user Jim 352 is not in the multi-user communication session and Jim cannot learn information about the participants in the multi-user communication session to maintain privacy.

Figure 4:
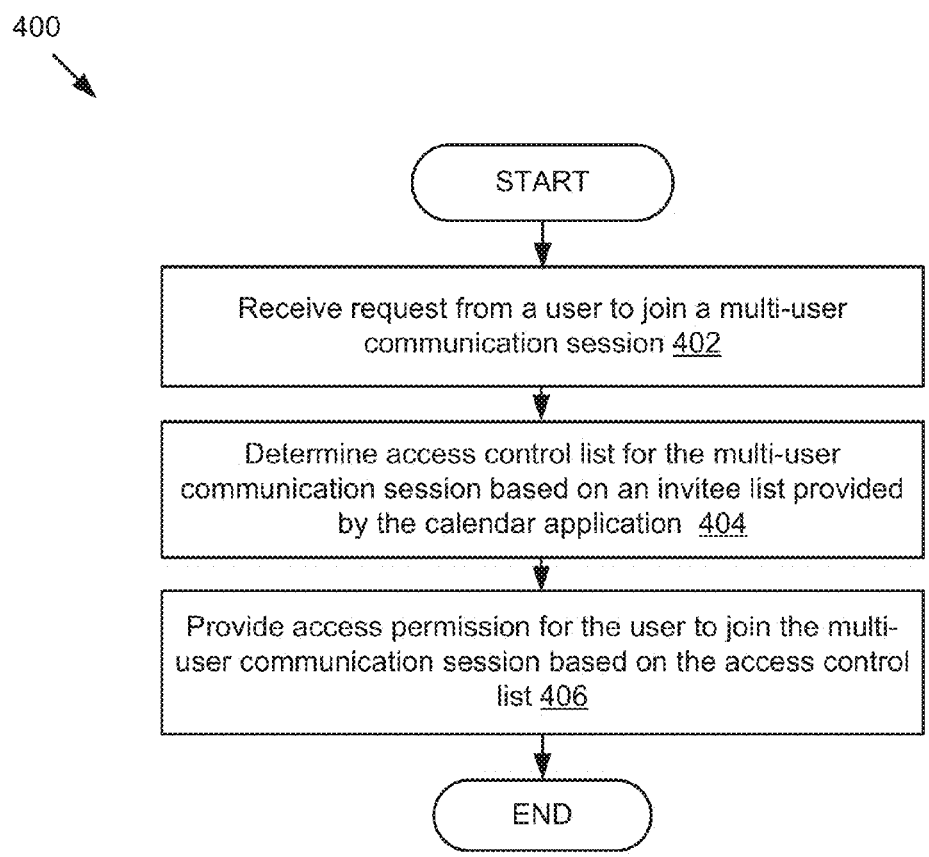
FIG. 4 is a flow diagram of an example of a method for providing access permission for a user to join the multi-user communication session based on the access control list.

FIG. 4 is a flow diagram 400 of an example of a method for providing access permission for a user to join the multi-user communication session based on the access control list. The conference application 103 includes a conference server module 205 and a session management module 207. The session management module 207 receives 402 a request from a user to join the multi-user communication session. The multi-user communication session is associated with a corresponding calendar event that includes an invitee list. For example, the calendar event can be a business meeting with colleagues. The conference server module 205 determines 404 an access control list for the multi-user communication session based on an invitee list provided by the calendar application 151. The access control list has one or more entries specifying permission for the one or more users who were invited in the calendar event. The session management module 207 retrieves the access control list from the storage device 243. The session management module 207 provides 406 access permission for the user to join the multi-user communication session based on the access control list.

Figure 5:
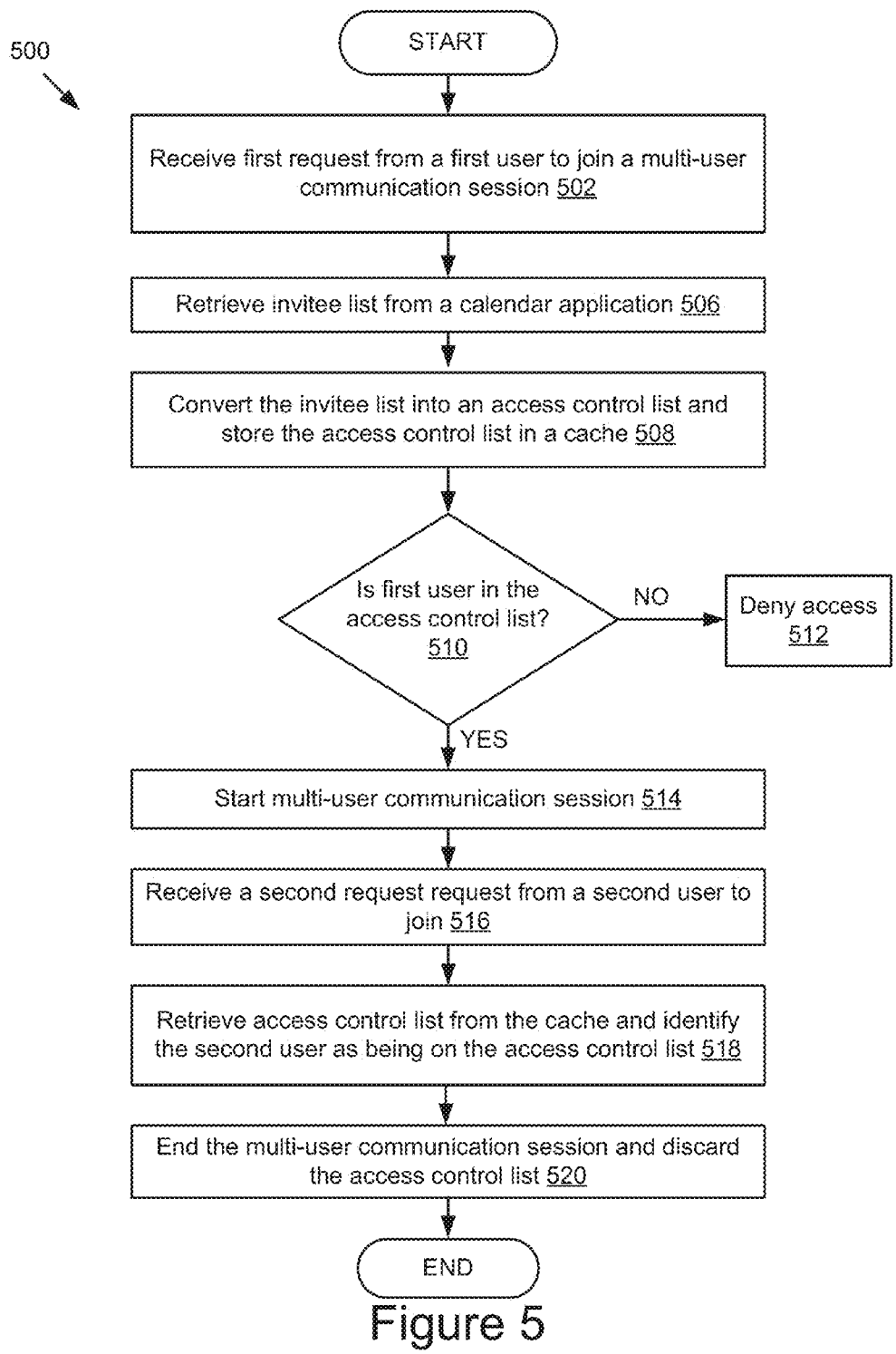
FIG. 5 is a flow diagram of another example of a method for providing access permission for a user to join the multi-user communication session based on the access control list.

FIG. 5 is a flow diagram 500 of an example of another method for providing access permission for a user to join the multi-user communication session based on the access control list. The conference application 103 includes a social network engine 203, a conference server module 205, a session management module 207 and a user interface engine 209. The session management module 207 receives 502 a first request from a first user to join a multi-user communication session. The multi-user communication session can be an oncoming multi-user communication session associated with a calendar event at a social network generated by the social network engine 203. The conference server module 205 retrieves 504 invitee list from a calendar application 151. For example, the conference server module 205 queries the calendar application 151 to transmit the invitee list. The invitee list comprises at least one of a name, an email identifier and a social network profile identifier of the one or more invitees. The conference server module 205 converts 506 the invitee list into an access control for the multi-user communication session and stores the access control list in a cache. The conference server module 205 extracts the identifying information (e.g. an email address) from the calendar invitee list and matches the identifying information to user profile information for the social network. If a match is found in the social network, the conference server module 205 generates a corresponding entry in the access control list for the multi-user communication session. The session management module 207 determines 510 whether the first user is in the access control list. If the first user is not present on the access control list, the session management module 207 denies 512 access for the first user. If the first user is present on the access control list, the session management module 207 starts 514 the multi-user communication session. The session management module 207 receives 516 a second request from a second user to join the multi-user communication session. The session management module 207 retrieves 518 the access control list from the cache and identifies the second user as being on the access control list. For example, a user Alice with a social network profile identifier "1234567" requests to join the multi-user communication session at the social network. If a corresponding matching entry (1234567, grant) is found in the access control list, then the user Alice is granted permission by the session management module 207 to join the multi-user communication session. The conference server module 205 ends 520 the multi-user communication session and discards the access control list. In some embodiments, the conference server module 205 discards the access control list within a few minutes of ending the session. In other embodiments, the conference server module 205 discards the access control list after a day or two. The conference server module 205 receives information from the session management module 207 instructing that the multi-user communication session has ended.

In the above description, for purposes of explanation, numerous specific details are set forth in order to provide a thorough understanding of the specification. It will be apparent, however, to one skilled in the art that the technology can be practiced without these specific details. In other instances, structures and devices are shown in block diagram form in order to avoid obscuring the description. For example, the present embodiment is described in one embodiment below primarily with reference to user interfaces and particular hardware. However, the present embodiment applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment of the description. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present embodiment of the specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware embodiment, an entirely software embodiment or an embodiment containing both hardware and software elements. In a preferred embodiment, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
receiving, using one or more computing devices, a first request from a first user to join a multi-user communication session that is associated with a social network, the first user being a member of the social network;
responsive to receiving the first request, retrieving, using the one or more computing devices, an invitee list from an event in a calendar application;
converting, using the one or more computing devices, the invitee list into an access control list and storing the access control list in a cache;
determining, using the one or more computing devices, whether the first user is on the access control list;
responsive to the first user being on the access control list, starting, using the one or more computing devices, the multi-user communication session;
receiving, using the one or more computing devices, a second request from a second user to join the multi-user communication session;

identifying, using the one or more computing devices, the second user as being on the access control list;
adding, using the one or more computing devices, the second user to the multi-user communication session;
ending, using the one or more computing devices, the multi-user communication session; and
discarding the access control list.

2. A computer-implemented method comprising:
receiving, using one or more computing devices, a first request from a first user to join a multi-user communication session that is associated with a social network, the first user being a member of the social network;
responsive to receiving the first request, retrieving, using the one or more computing devices, an invitee list from an event in a calendar application;
converting, using the one or more computing devices, the invitee list into an access control list;
determining, using the one or more computing devices, whether the first user is on the access control list; and
responsive to the first user being on the access control list, starting, using the one or more computing devices, the multi-user communication session.

3. The method of claim 2, further comprising:
receiving, using the one or more computing devices, a second request from a second user to join the multi-user communication session;
identifying, using the one or more computing devices, the second user as being on the access control list; and
adding, using the one or more computing devices, the second user to the multi-user communication session.

4. The method of claim 2, wherein determining whether the first user is on the access control list further comprises:
extracting identifiers of the users from the access control list;
comparing a user profile of the first user to the identifiers to identify a match; and
responsive to determining the match, confirming that the first user is on the access control list.

5. The method of claim 2, further comprising:
responsive to receiving a request from the calendar application, transmitting identifying information associated with a group in the social network;
wherein the multi-user communication session is associated with the group in the social network.

6. The method of claim 2, further comprising:
receiving a request from the first user to add a third user to the multi-communication session;
adding the third user to the access control list; and
adding the third user to the multi-user communication session.

7. The method of claim 2, further comprising:
saving the access control list to a cache; and
discarding the access control list from the cache at an end of the multi-user communication session.

8. The method of claim 2, wherein the access control list is created anew responsive to the event recurring in the calendar application.

9. The method of claim 2, wherein the invitee list comprises at least one of a name, an email identifier and a social network profile identifier of one or more invitees.

10. The method of claim 2, wherein responsive to the first user not being in the access control list, further comprising denying the first user access to the multi-user communication session.

11. A system comprising:
one or more processors, the one or more processors being configured to:
receive a first request from a first user to join a multi-user communication session that is associated with a social network, the first user being a member of the social network;
retrieve an invitee list from an event in a calendar application;
convert the invitee list into an access control list;
determine whether the first user is on the access control list; and
responsive to the first user being on the access control list, start the multi-user communication session.

12. The system of claim 11, wherein the one or more processors are further configured to:
receive a second request from a second user to join the multi-user communication session;
identify the second user as being on the access control list; and
add the second user to the multi-user communication session.

13. The system of claim 11, wherein the one or more processors are further configured to:
responsive to receiving a request from the calendar application, transmit identifying information associated with a group in the social network;
wherein the multi-user communication session is associated with the group in the social network.

14. The system of claim 11, wherein the one or more processors determine whether the first user is on the access control list by:
extracting identifiers of the users from the access control list;
comparing a user profile of the first user to the identifiers to identify a match; and
responsive to determining the match, confirming that the first user is on the access control list.

15. The system of claim 11, wherein the one or more processors are further configured to:
receive a request from the first user to add a third user to the multi-communication session;
add the third user to the access control list; and
add the third user to the multi-user communication session.

16. The system of claim 11, wherein the one or more processors are further configured to:
save the access control list to a cache; and
discard the access control list from the cache at an end of the multi-user communication session.

17. The system of claim 11, wherein the access control list is created anew responsive to the event recurring in the calendar application.

18. The system of claim 11, wherein the invitee list comprises at least one of a name, an email identifier and a social network profile identifier of one or more invitees.

19. The system of claim 11, wherein responsive to the first user not being in the access control list, further comprising denying the first user access to the multi-user communication session.

* * * * *